United States Patent
Askerdal et al.

(10) Patent No.: US 9,604,789 B2
(45) Date of Patent: Mar. 28, 2017

(54) GUIDE RAIL

(71) Applicant: FlexLink AB, Göteborg (SE)

(72) Inventors: Magnus Askerdal, Hajom (SE); Tommy Karlsson, Onsala (SE)

(73) Assignee: FlexLink AB, Göteborg (SE)

( * ) Notice: Subject to any disclaimer, the term of this patent is extended or adjusted under 35 U.S.C. 154(b) by 0 days.

(21) Appl. No.: 15/022,810

(22) PCT Filed: Sep. 15, 2014

(86) PCT No.: PCT/SE2014/051064
§ 371 (c)(1),
(2) Date: Mar. 17, 2016

(87) PCT Pub. No.: WO2015/041591
PCT Pub. Date: Mar. 26, 2015

(65) Prior Publication Data
US 2016/0229639 A1  Aug. 11, 2016

(30) Foreign Application Priority Data
Sep. 18, 2013 (SE) ...................................... 1351072

(51) Int. Cl.
*B65G 15/64* (2006.01)
*B65G 15/60* (2006.01)
(Continued)

(52) U.S. Cl.
CPC .............. *B65G 45/00* (2013.01); *B65G 15/62* (2013.01); *B65G 21/20* (2013.01); *B65G 21/22* (2013.01)

(58) Field of Classification Search
CPC ........ B65G 15/62; B65G 15/64; B65G 21/06; B65G 21/22; B65G 21/2072; B65G 207/26; B65G 45/10
(Continued)

(56) References Cited

U.S. PATENT DOCUMENTS 4,146,126 A     3/1979  Mattos
4,793,470 A *  12/1988  Andersson ............. B65G 15/62
                                              198/823
(Continued)

FOREIGN PATENT DOCUMENTS

DE     102006053913 A1    5/2008
EP         0960841 A1   12/1999

OTHER PUBLICATIONS

"International Application Serial No. PCT/SE2014/051064, International Search Report mailed Dec. 10, 2014", 4 pgs.
(Continued)

*Primary Examiner* — James R Bidwell
(74) *Attorney, Agent, or Firm* — Schwegman Lundberg & Woessner, P.A.

(57) ABSTRACT

Guide rail for an easy to clean conveyor, where the guide rail is adapted to have a straight position, in which position the guide rail is adapted to support a conveyor chain, and a folded position spaced apart from the straight position, where the guide rail comprises an upper support part adapted to glidingly support a conveyor chain, and a lower attachment part adapted to attach the guide rail to a holder, where the lower attachment part is adapted to allow the guide rail to pivot in the holder between the straight position and the folded position. In this way, a guide rail that allows for an easy cleaning of a conveyor is provided for. Such conveyors are e.g. used in the food industry.

14 Claims, 2 Drawing Sheets

(51) Int. Cl.
*B65G 45/00* (2006.01)
*B65G 15/62* (2006.01)
*B65G 21/20* (2006.01)
*B65G 21/22* (2006.01)

(58) Field of Classification Search
USPC .................. 198/841, 839, 836.4, 860.1, 493
See application file for complete search history.

(56) References Cited

U.S. PATENT DOCUMENTS

| | | | |
|---|---|---|---|
| 6,044,960 A * | 4/2000 | Cloud | B65G 17/00 198/493 |
| 6,202,834 B1 | 3/2001 | Layne et al. | |
| 7,497,326 B2 * | 3/2009 | McGuire | B65G 15/00 198/831 |
| 2002/0179420 A1 * | 12/2002 | Enomoto | B23Q 11/0057 198/861.5 |
| 2009/0000923 A1 | 1/2009 | Jager | |
| 2012/0018283 A1 | 1/2012 | Dallner et al. | |
| 2013/0180833 A1 * | 7/2013 | Olsen | B65G 21/02 198/841 |

OTHER PUBLICATIONS

"International Application Serial No. PCT/SE2014/051064, International Written Opinion mailed Dec. 10, 2014", 4 pgs.
"International Application Serial No. PCT/SE2014/051065, International Search Report mailed Dec. 10, 2014", 4 pgs.
"International Application Serial No. PCT/SE2014/051065, Written Opinion mailed Dec. 10, 2014", 5 pgs.

* cited by examiner

GUIDE RAIL

PRIORITY APPLICATIONS

This application is a U.S. National Stage Filing under 35 U.S.C. 371 from International Application No. PCT/SE2014/051064, filed on 15 Sep. 2014, and published as WO 2015/041591 on 26 Mar. 2015, which claims the benefit of priority to Swedish Application No. 1351072-2, filed on 18 Sep. 2013; which applications and publication are incorporated herein by reference as if reproduced herein and made a part hereof in their entirety, and the benefit of priority of each of which is claimed herein.

TECHNICAL FIELD

The present invention relates to a guide rail adapted to be used in easy to clean conveyors. The guide rail simplifies the cleaning of the conveyor. The guide rail is further provided with a stiff inner section and a low friction outer section.

BACKGROUND ART

Conveying devices, such as those which are used for moving objects between different stations in a factory, usually comprise a conveying track comprising a belt or a chain. A conveyor track consists of an endless conveyor chain that is supported by conveyor beams. The conveyor chain glides on sliding surfaces on the conveyor beams in order to reduce the friction and the wear. This surface may be the conveyor beam itself or may be an additional component, such as a slide rail. The conveyor track may comprise curves and bends and at the end regions of a conveyor track, there is either a drive unit which drives the chain or an idler end unit which supports the chain for the return path.

There are a number of different designs for such conveyors available. Products may either be conveyed directly on the conveyor belt or chain, or may be conveyed on product carriers. A conveyor chain is made up of a large number of individual chain parts, designed to be able to support the conveyed products. A conveyor system is adapted to different types of products. For some products, such as medical equipments or in lab automation, the environment is clean and dust free, whereas for other products, the environment may be dusty, wet and/or messy. In these cases, it is important that it is relatively easy to clean the conveyor in order to reduce wear of the conveyor and to ensure a reliable operation.

One such industry is the food industry, where various requirements regarding cleanness are imposed on the handling of goods, mainly to ensure good sanitary conditions in the manufacturing or packaging process. This is necessary to ensure that the food products are not contaminated. Depending on the type of food products, more or less hygienic demands are imposed. In order to meet these requirements, a number of measures are often taken. These include different cleaning schemes, with e.g. cleaning parts of the conveyor at regular intervals, with a more thorough cleaning at less frequent intervals. These may include partly disassembling the conveyor system at regular intervals, and removing the chain to allow cleaning the conveyor system and chain.

There is further often requirements on the conveyor system regarding safety. The moving mechanical parts of the system should be enclosed in order to prevent operators from coming into contact with the moving parts of the system. One way of obtaining such a secure conveyor system is to use protective covers arranged close to the moving parts, such that objects such as fingers cannot pass through. However, such an enclosed conveyor system is more difficult to clean.

Different approaches for the cleaning of hygienic conveyor systems are known. In most systems, the conveyor chain can be raised to a position above the conveyor track, in order to gain access to the interior of the conveyor. The conveyor chain may also be removed to allow both the chain and the conveyor to be cleaned. It is further known to remove other parts of the conveyor, such as covers, guide rails, etc in order to be able to clean all parts of the conveyor.

US 20120018283 A1 describes a conveyor equipped with removable side panels, which can be removed to facilitate the cleaning of the interior of the conveyor, as well as the interior side of the side panel.

While this solution makes the conveyor system easier to clean, it requires partial disassembly of the conveyor system, which takes a lot of time, effort and manpower. Another problem with the removal of parts is that the parts must be kept somewhere during the cleaning. There is also a risk that fasteners or other parts are lost and not replaced, which may lead to malfunction of the conveyor system.

It is therefore an object of this invention to provide an improved conveyor system structure remedying the deficiencies noted above.

DISCLOSURE OF INVENTION

An object of the invention is therefore to provide an improved guide rail for a conveyor, which facilitates the cleaning of the conveyor. A further object of the invention is to provide a conveyor which is easy to clean.

The solution to the problem according to the invention is described in the characterizing part of claim 1 with regards to the guide rail and in claim 9 with regards to the conveyor. The other claims contain advantageous embodiments and further developments of the guide rail and the conveyor.

In a guide rail for an easy to clean conveyor, where the guide rail is adapted to have a straight position, in which position the guide rail is adapted to support a conveyor chain, and a folded position spaced apart from the straight position, the object of the invention is achieved in that the guide rail comprises an upper support part adapted to glidingly support a conveyor chain, and a lower attachment part adapted to attach the guide rail to a holder, where the lower attachment part is adapted to allow the guide rail to pivot in the holder between the straight position and the folded position.

By this first embodiment of the guide rail according to the invention, the guide rail enables a secure conveyor where the clamp risk is minimized and which at the same time allows for an easy cleaning of the conveyor. The guide rail is attached to the conveyor and can be folded sideways in order to allow cleaning access of the space between the guide rail and the protective cover. By folding the guide rail to a folded position, the guide rail and the adjacent space can be cleaned without having to remove the guide rail.

In this way, regular washing can be made in an easy and time-efficient way. Such washing is made in regular time periods, e.g. once a day or every four hours. An advantage of this is that the guide rail does not have to be removed for the cleaning. The guide rail can, when required, also be removed when it is in the folded position, which may be advantageous when a more thorough washing of the conveyor is to be made.

The guide rail is preferably made from two different materials, where one material encloses the other. In this way, a guide rail with a smooth outer surface which is easy to clean and which has a low friction value can be provided. At the same time, an inner load carrying material functions as reinforcement and provides the required stiffness and rigidity of the guide rail. Suitable materials are e.g. an inner section made from reinforced plastic such as fibreglass reinforced plastic, and an outer section made from e.g. HDPE. The guide rail is preferably made in an extrusion process, which allows for long guide rail sections.

BRIEF DESCRIPTION OF DRAWINGS

The invention will be described in greater detail in the following, with reference to the embodiments that are shown in the attached drawings, in which.

MODES FOR CARRYING OUT THE INVENTION

The embodiments of the invention with further developments described in the following are to be regarded only as examples and are in no way to limit the scope of the protection provided by the patent claims.

Figure 1:
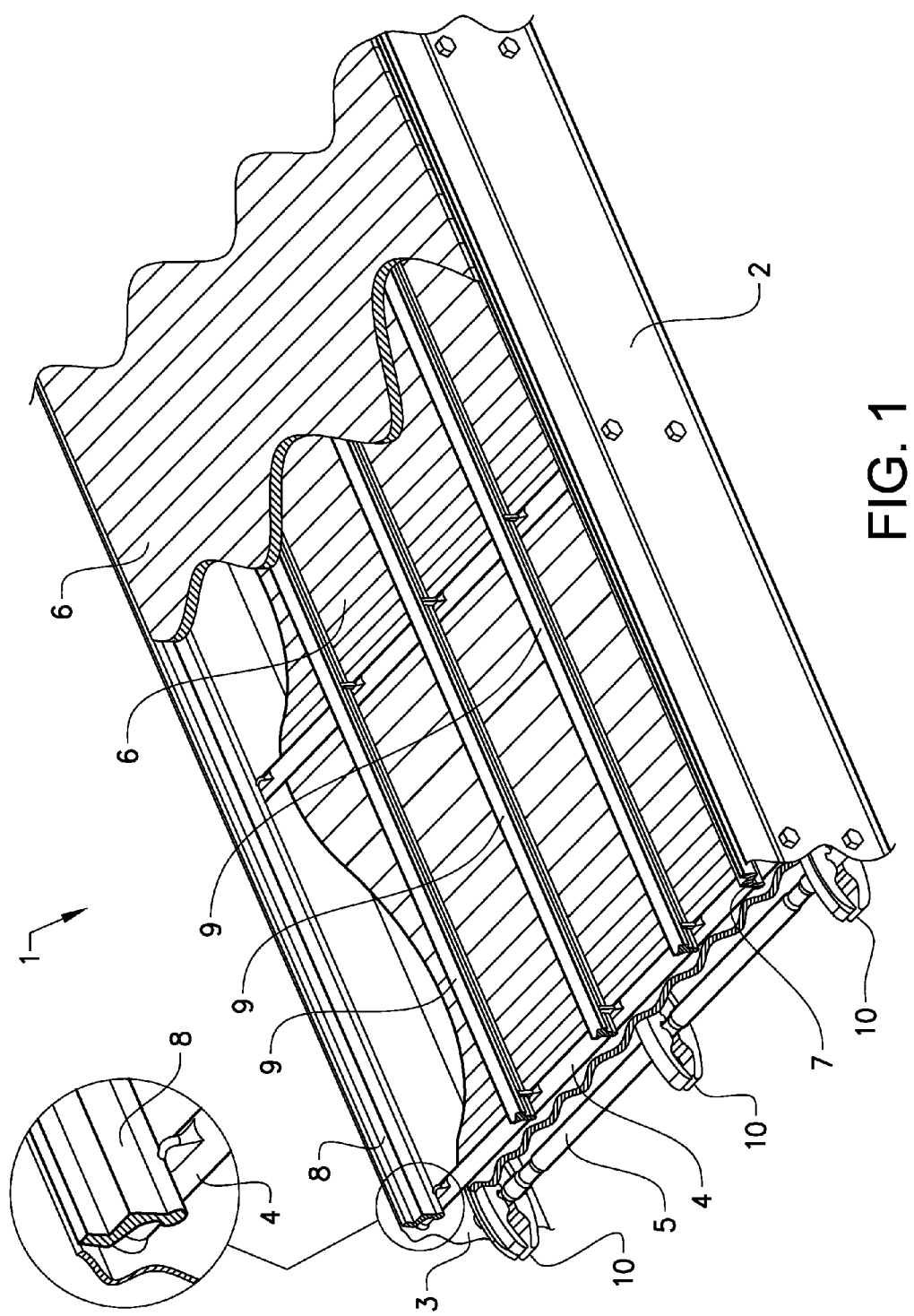
FIG. 1 shows a view of a conveyor comprising a guide rail according to the invention.
Figure 3:
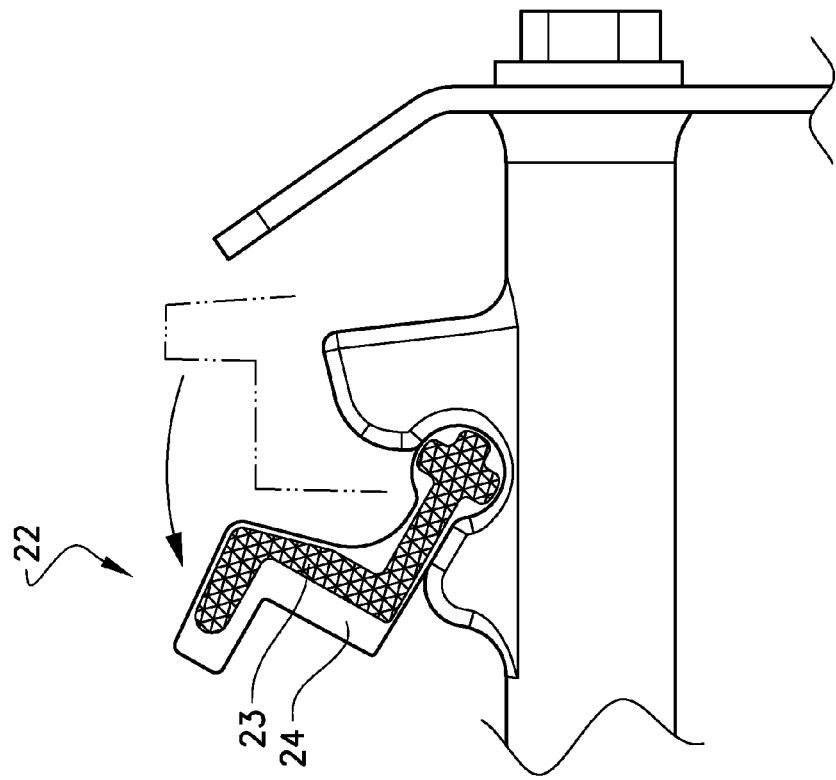
FIG. 3 shows the guide rail according to the invention in a second, folded position.
Figure 2:
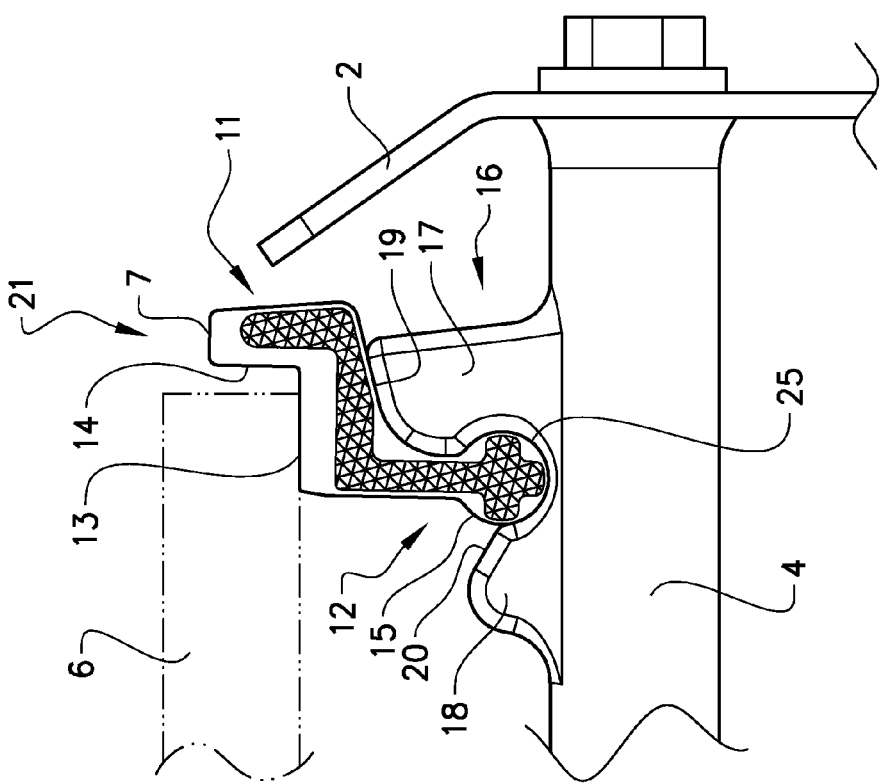
FIG. 2 shows the guide rail according to the invention in a first, straight position.

FIG. 1 shows a view of a conveyor comprising a guide rail according to the invention. FIG. 2 shows the guide rail in a straight position and FIG. 3 shows the guide rail in a folded position. The conveyor 1 comprises a first side wall 2 and a second side wall 3. The side walls acts in this example both as longitudinal beams which supports the conveyor and as protective covers which prevents fingers and other objects to get caught between the guide rail and the protective cover. A finger will thus be prevented from getting squeezed by the moving parts of the conveyor. The conveyor further comprises a plurality of transverse rods 4 and transverse axles 5 interconnecting the side walls and supporting the conveyor chain. The conveyor further comprises a drive unit in one end and an idler unit in the other end of the conveyor (not shown).

The transverse rods 4 are provided with guide rails 7, 8 and support rails 9. The guide rails and the support rails provide a flat upper bearing plane for the conveyor chain 6. The upper surface of the support rails are preferably made from a low friction material such that the conveyor chain can easily glide on the support rails. At the same time, the support rails must be relatively stiff such that they can support the conveyor chain and the transported goods such that the longitudinal spacing between two transverse rods 4 can be relatively long. The guide rails are adapted to have a straight position in which they support a conveyor chain and spaced apart a folded position in which cleaning is facilitated.

The transverse axles 5 support the conveyor chain in the return path of the conveyor. Each transverse axle is provided with several return supports 10 which allows the conveyor chain to glide on the return supports in an energy efficient way. The return supports are preferably round or oval such that the conveyor chain can glide easily even though the conveyor chain is having an excessive length. The purpose of an excessive length is to be able to raise the conveyor chain when cleaning in order to provide access to the inner of the conveyor.

The transverse rods are provided with two guide rails 7, 8, one on each side of the conveyor. The guide rails are provided with an upper part 11 adapted to support a conveyor chain and a lower part 12 adapted to attach the guide rail to a holder on the transverse rod. In FIGS. 2 and 3, the right hand side guide rail 7 is shown. The upper part 11 is adapted to support a conveyor chain conveying products, such as food articles. The upper support part 11 is provided with a horizontal bearing surface 13 adapted to support a conveyor chain and a vertical bearing surface 14 adapted to guide a conveyor chain in a sideway direction. The lower attachment part comprises an axle member 15 adapted to cooperate with a holder 16 arranged on a transverse rod. The guide rail can pivot between a straight position and a folded position by the axle member.

The holder 16 comprises an outer protrusion 17 and an inner protrusion 18. The holder is provided with a mouth 25 which is adapted to cooperate with and hold the axle member 15. In this example, the mouth 25 is semi-circular and is adapted to cooperate with the circular axle member 15. The opening of the mouth is slightly narrower than the diameter of the axle member. In this way, the axle member is inserted through the mouth opening by a snap action and is held in place by the mouth. The outer protrusion 17 is provided with a bearing surface 19 which corresponds to the shape of the guide rail such that the guide rail will be supported by the outer protrusion when it is in the straight position 21. In this example, both the mouth and the axle member have a circular shape. This allows the guide rail to pivot around the axle member, i.e. to be folded, to a folded position 22. In the folded position, the guide rail will bear on an inner bearing surface 20 of the inner protrusion 18. In this folded position, the guide rail is folded sideways in the conveyor such that access to the space between the guide rail and the protective cover is allowed. In this way, this space will be easy to clean without having to remove either the guide rail or the protective cover. The guide rail will be held by the mouth also in the folded position.

The guide rail is preferably folded by at least 30 degrees from the straight position to the folded position, and preferably more than 45 degrees. The folding angle is partly dependent on the height of the guide rail, such that a higher guide rail will provide a sufficient access to the area between the guide rail and the protective cover with a smaller folding angle. In the shown example, the guide rail is folded by approximately 60 degrees.

It is also possible to remove the guide rail if required. By designing the mouth 25 and the axle member 15 appropriately, it will be possible to snap the guide rail from the holder by pulling the guide rail upwards. It is also possible to design the axel member and the mouth with a shape that will allow the guide rail to be removed without any force, e.g. by making the axle member non-circular. In this example, the guide rail will not be held in place by the mouth in the folded position, and can be removed without a snap action. A suitable shape may also be an oval shape or a non-symmetric shape.

In use, the guide rail may be folded to the folded position when the conveyor chain is in a raised position. This may be done for regular cleaning, which normally takes place one or a few times a day. For a more thorough cleaning, the guide rail may be removed from the conveyor. This may be done e.g. once a week or at maintenance intervals.

The guide rail is preferably manufactured from two different materials. The guide rail must on one side provide a low friction bearing surface for the conveyor chain in order to reduce wear, noise and energy consumption and on the other hand provide a stiff and rigid support for the conveyor chain and the products conveyed. It is further of advantage to position the transverse rods at a relatively long distance apart. Further, the guide rail must be easy to clean and must not comprise any joints or slits which can catch any food particles. It is thus of advantage that the guide rail is stiff but with a smooth, low friction surface.

Such a guide rail is preferably manufactured in an extrusion process. The guide rail comprises an inner load carrying section 23 and an outer low friction section 24. It is possible to use a stiff inner material, such as a reinforced plastic, which has a relatively rough surface, and coat the complete inner part with a smooth, low friction material, such as a HDPE. By coating the complete inner part, joints that could be contaminated with bacteria and the likes are avoided. Further, this makes it possible to provide a stiff guide rail with a smooth outer surface. Preferably, the horizontal and vertical bearing surfaces of the guide rail are provided with a relatively thick coating of the outer material in order to prolong the life of the guide rail.

The guide rail is preferably used for hygienic purposes, where it is important that the conveyor does not comprise any hidden spaces where contaminations, bacteria etc can hide. Such conveyors must also be easy to clean. By providing a foldable guide rail, the conveyor will be easy to clean. By providing a guide rail made from two materials, where one material encloses the other, a stiff and smooth guide rail is obtained.

The invention is not to be regarded as being limited to the embodiments described above, a number of additional variants and modifications being possible within the scope of the subsequent patent claims. The guide rail may have any size and may be made from any suitable material. Other shapes are also possible.

REFERENCE SIGNS

1: Conveyor
2: Side wall
3: Side wall
4: Transverse rod
5: Transverse axle
6: Conveyor chain
7: Guide rail
8: Guide rail
9: Support rail
10: Return support
11: Upper support part
12: Lower attachment part
13: Horizontal bearing surface
14: Vertical bearing surface
15: Axle member
16: Holder
17: Outer protrusion
18: Inner protrusion
19: Outer bearing surface
20: Inner bearing surface
21: Straight position
22: Folded position
23: Inner load carrying section
24: Outer low friction section
25: Mouth

The invention claimed is:

1. A guide rail for an easy to clean conveyor wherein, the guide rail is adapted to have a straight position in which position the guide rail is adapted to support a conveyor chain (6), and a folded position spaced apart from the straight position, wherein the guide rail comprises:
    an upper support part adapted to glidingly support a conveyor chain; and
    a lower attachment part adapted to attach the guide rail to a holder, wherein the lower attachment part is adapted to allow the guide rail to pivot in the holder between the straight position and the folded position, and
    wherein the upper support part comprises a horizontal bearing surface adapted to carry the conveyor chain and a vertical bearing surface adapted to guide the conveyor chain in a sideway direction.

2. The guide rail according to claim 1, wherein the lower attachment part comprises a circular axle member.

3. The guide rail according to claim 1, wherein the lower attachment part comprises an oval axle member.

4. The guide rail according to claim 1, wherein the guide rail is made from two different materials.

5. The guide rail according to claim 1, wherein the guide rail comprises an inner load carrying section and an outer low friction section.

6. The guide rail according to claim 5, wherein the inner load carrying section is made from a reinforced plastic material and that the outer low friction section is made from HDPE (High-density polyethylene).

7. The guide rail according to claim 1, wherein the guide rail is extruded.

8. A conveyor comprising:
    a guide rail, wherein the guide rail includes:
        an upper support part adapted to glidingly support a conveyor chain; and
    a lower attachment part adapted to attach the guide rail to a holder, wherein the lower attachment part is adapted to allow the guide rail to pivot in the holder between a straight position and a folded position, and
        wherein the upper support part comprises a horizontal bearing surface adapted to carry the conveyor chain and a vertical bearing surface adapted to guide the conveyor chain in a sideway direction.

9. The conveyor according to claim 8, wherein the conveyor comprises two longitudinal carrying beams and a plurality of transversal support rods wherein each support rod is provided with a holder adapted to hold the guide rail by the lower attachment part.

10. The conveyor according to claim 9, wherein the guide rail is adapted to be mounted in a straight position close to a carrying beam in order to prevent intrusion of a finger between the guide rail and the carrying beam, in which position the guide rail is adapted to support a conveyor chain, and in the folded position in which the guide rail is folded away from the carrying beam in order to allow access to the space between the guide rail and the carrying beam.

11. The conveyor according to claim 9, wherein the holder comprises an outer protrusion which is adapted to support the guide rail in the straight position, and an inner protrusion which allows the guide rail to be folded towards the inner protrusion.

12. The conveyor according to claim 9, wherein the guide rail can be folded by at least 30 degrees.

13. The conveyor according to claim 9, wherein the guide rail can be detached from the holder by pulling the guide rail from the holder.

14. The conveyor according to claim 9, wherein the guide rail is attached to the holder when the guide rail is in the folded position.

\* \* \* \* \*